United States Patent
Marupaduga et al.

(10) Patent No.: US 10,687,261 B1
(45) Date of Patent: Jun. 16, 2020

(54) HANDOVER TO HELP MEET BIT-RATE GUARANTEE UPON ESTABLISHMENT OF GUARANTEED-BIT-RATE BEARER

(71) Applicant: Sprint Spectrum L.P., Overland Park, KS (US)

(72) Inventors: Sreekar Marupaduga, Overland Park, KS (US); Roger Bartlett, Merriam, KS (US); John W. Prock, Raymore, KS (US); Mark Wade, Trimble, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/689,647

(22) Filed: Aug. 29, 2017

(51) Int. Cl.
*H04W 36/00* (2009.01)
*H04W 36/18* (2009.01)
*H04W 36/30* (2009.01)

(52) U.S. Cl.
CPC ........ *H04W 36/18* (2013.01); *H04W 36/0011* (2013.01); *H04W 36/30* (2013.01); *H04W 36/0055* (2013.01); *H04W 36/0083* (2013.01)

(58) Field of Classification Search
CPC . H04W 36/18; H04W 36/0011; H04W 36/30; H04W 36/0055; H04W 36/0083
See application file for complete search history.

(56) References Cited

U.S. PATENT DOCUMENTS

| | | | |
|---|---|---|---|
| 2005/0239510 A1* | 10/2005 | Cho | H04B 7/022 455/562.1 |
| 2007/0077928 A1* | 4/2007 | Kim | H04W 36/30 455/436 |
| 2007/0249347 A1* | 10/2007 | Saifullah | H04W 36/38 455/436 |
| 2013/0064226 A1* | 3/2013 | Dinan | H04W 36/30 370/332 |
| 2013/0077966 A1* | 3/2013 | Gelbman | H04B 10/25753 398/43 |
| 2014/0204902 A1* | 7/2014 | Maltsev | H04W 36/0083 370/331 |
| 2018/0279409 A1* | 9/2018 | Balasubramanian | H04W 76/10 |

* cited by examiner

*Primary Examiner* — Pakee Fang (57) ABSTRACT

When a base station that does not support downlink beamforming is serving a UE and a guaranteed-bit-rate (GBR) bearer is established for the UE, the base station will detect the establishment of the GBR bearer for the UE and will responsively trigger handover of the UE to another base station selected based on the other base station supporting downlink beamforming. With this process, handing the UE over to a base station that supports downlink beamforming may thereby help to ensure successful transmission to the UE at the GBR associated with the bearer.

20 Claims, 6 Drawing Sheets

HANDOVER TO HELP MEET BIT-RATE GUARANTEE UPON ESTABLISHMENT OF GUARANTEED-BIT-RATE BEARER

BACKGROUND

A cellular wireless network typically includes a number of base stations that provide wireless coverage areas, such as cells and cell sectors, in which user equipment devices (UEs) such as cell phones, tablet computers, tracking devices, embedded wireless modules, and other wirelessly equipped communication devices (whether or not technically operated by a human user), can operate. In turn, each base station could be coupled with network infrastructure, including one or more gateways and switches, that provides connectivity with one or more transport networks, such as the public switched telephone network (PSTN) and/or a packet-switched network such as the Internet for instance. With this arrangement, a UE within coverage of the network could engage in air interface communication with a base station and could thereby communicate via the base station with various remote network entities or with other served UEs.

When a cellular wireless network serves UEs, the network could allocate various resources to facilitate communication to and from the UEs. In an example arrangement, for instance, the network could establish "bearers," which could define physical or logical communication channels for carrying UE communication, such as virtual tunnels extending between the UEs a transport network gateway. Each such bearer could include a radio-bearer component that extends between a UE and a serving base station and an access-bearer component that extends between the serving base station and the transport network gateway. Further, each such bearer could have an associated service level defined by various service-level attributes, to support a particular quality of service or type of service. In practice, the network could allocate a number of such bearers for a UE, to support various different types of communication services.

By way of example, when the UE first enters into coverage of a base station, the UE could engage in a registration or "attachment" process that causes the network to establish for the UE certain default bearers for particular types of service, in accordance with the UE's service profile. For instance, if the UE's service profile indicates that the UE supports general packet-data communication (such as web browsing, file transfer, and the like), the network may establish for the UE a default bearer for carrying such communications with a best-effort service level. Further, if the UE's service profile indicates that the UE supports voice over Internet Protocol (VoIP) communications or other such real-time packet-based communication service, the network may establish for the UE a default bearer with a medium service level to support Session Initiation Protocol (SIP) signaling or the like to facilitate setup of such communications.

In turn, as a UE is being served by a base station, if the UE is going to engage in another type of communication service, the network may establish for the UE still other bearers, possibly with other service levels. For instance, if the UE supports VoIP service and seeks to engage in a VoIP call, or a VoIP call server seeks to connect a call to the UE, the network may establish for the UE a bearer with a high service level to carry the VoIP bearer traffic (e.g., packets representing voice), and the UE may then engage in the VoIP call via that bearer. Further, if the UE supports online gaming service and seeks to engage in gaming communication, the network may establish for the UE a bearer with a relatively high service level for that gaming communication, and the UE may then engage in the gaming via that bearer.

Each bearer that the network allocates to a UE could have an associated quality of service class indicator (QCI) that indicates service-level attributes of the bearer, such as whether the bearer is a "guaranteed bit rate" (GBR) bearer (having a guaranteed minimum bit rate suitable for an associated application) and if so what the GBR of the bearer is, as well as other attributes such as maximum bit rate (MBR), priority level, packet-delay budget, and packet error loss rate, for instance.

In a representative implementation, for instance, QCIs could range from 1 to 9, with QCIs 1-4 designating GBR bearers and QCIs 5-9 designating non-GBR bearers (i.e., bearers that do not have a guaranteed minimum bit rate). More specifically, in this implementation, a QCI 1 bearer is a GBR bearer for carrying conversational voice (e.g., VoIP) traffic, a QCI 3 bearer is a GBR bearer for carrying real-time gaming traffic, a QCI 5 bearer is a non-GBR bearer for carrying SIP signaling or the like, and a QCI 8 or QCI 9 bearer is a non-GBR bearer for carrying general packet-data communication.

When a base station serves a UE, the base station could maintain a context record for the UE, identifying each bearer established for the UE, and specifying the QCI level and/or other attributes of the bearer, for reference by the base station to help ensure appropriate service for the UE. To the extent the base station coordinates air interface communication with the UE on a particular bearer, the base station could work to do so in accordance with the QCI level of the bearer. For instance, when the base station coordinates transmission to the UE on a GBR bearer, the base station could work to ensure that sufficient air interface resources are allocated for that communication, to support communication at the GBR of the bearer.

OVERVIEW

When a UE is served by a base station, the UE's coverage from the base station could depend on various factors, such as how far the UE is from the base station. If the UE is nearby the base station, the UE may have good coverage, with strong downlink signal strength and few if any errors in transmission from the base station. Whereas, if the UE is distant from the base station, the UE may have poor coverage, with weak downlink signal strength and potentially more errors in transmission from the base station.

Unfortunately, if a UE has poor coverage of its serving base station when the network is serving the UE with a GBR bearer, it could be difficult for the base station successfully transmit to the UE at a data rate that satisfies the GBR requirement of the bearer. This difficulty could arise, for instance, if the poor coverage results in increased errors in transmission and the increased errors in transmission lead to re-transmissions, thereby reducing overall downlink throughput.

One way to help overcome this problem is for the base station to apply downlink beamforming for its transmission to the UE. For example, if the base station is equipped with a phased array antenna, the base station could appropriately set the amplitude and phase of individual antenna elements so that the waveforms of signals transmitted from various antenna elements constructively combine in the direction of the UE. Downlink beamforming could help improve the base station's antenna gain and associated transmission quality and throughput in the direction of the UE and could therefore help to facilitate GBR communication to the UE when the UE is distant from the base station or otherwise in poor coverage of the base station (or for that matter even if the UE is not within poor coverage of the base station).

While downlink beamforming could work well in practice to help meet a GBR requirement for a UE, however, some base stations might not support downlink beamforming and might therefore be unable to use downlink beamforming to help provide GBR transmission to a UE. For instance, some base stations may not include the physical equipment (e.g., a phased array antenna and/or other equipment) that would be used to provide downlink beamforming. Further, even if a base station includes such equipment, the base station might be logically set (e.g., flagged or programmed) to not provide downlink beamforming service. If the base station that serves a UE with a GBR bearer is thus not configured to support downlink beamforming, the base station would be unable to provide downlink beamforming to the UE.

In addition, certain base stations in a cellular wireless network may have limited capacity and may therefore be unable to reliably support GBR transmission to a UE. For instance, a base station might operate as a "donor base station" serving one or more relays, with each relay in turn being configured to serve potentially multiple UEs. With such an arrangement, the air interface provided by the base station might have relatively limited capacity, as it may be occupied with control and bearer communications related to operation of each relay and to service of the UEs served by each relay. When a base station is serving one or more relays and is also serving the UE at issue, the base station might therefore lack sufficient air interface resources to accommodate transmission to the UE at a GBR.

Disclosed herein is a method and system to help address this issue. In accordance with the disclosure, when a base station that does not support downlink beamforming is serving a UE and a GBR bearer is established for the UE, the base station will detect the establishment of the GBR bearer for the UE and will responsively trigger handover of the UE to another base station selected based on the other base station supporting downlink beamforming. With this process, handing the UE over to a base station that supports downlink beamforming can help to ensure successful transmission to the UE at the GBR associated with the bearer.

Accordingly, in one respect, disclosed is a method for controlling handover of a UE when the UE is being served by a first base station that is not configured to support downlink beamforming. In accordance with the disclosure, the method includes the first base station detecting establishment for the UE of a GBR bearer and, responsive to at least the detecting of the establishment for the UE of the GBR bearer, the first base station triggering handover of the UE from the first base station to a second base station selected based at least on the second base station being configured to support downlink beamforming.

Further, in another respect, disclosed is a method of controlling handover of a UE when the UE is being served by a first base station that is not configured to support downlink beamforming and that is currently serving one or more relays in addition to serving the UE. In accordance with the disclosure, the method includes the first base station detecting establishment for the UE of a GBR bearer and, responsive to at least the detecting of the establishment for the UE of the GBR bearer, the first base station triggering handover of the UE from the first base station to a second base station selected based at least on the second base station (i) being configured to support downlink beamforming and (ii) not serving any relays.

Still further, in yet another respect, disclosed is the first base station in a system that includes the first base station and a second base station, where the first base station does not support downlink beamforming and the second base station supports downlink beamforming. In accordance with the disclosure, the first base station includes an antenna structure through which the first base station engages in air interface communication with a UE when the first base station serves the UE. Further, the first base station includes a backhaul communication interface through which the first base station can communicate with the second base station. And the first base station includes a controller comprising a processing unit, data storage, and program instructions stored in the data storage and executable by the processing unit to carry out operations such as those noted above when the first base station is serving the UE. For instance, the operations could include (i) detecting establishment for the UE of a GBR bearer and (ii) responsive to at least the detecting of the establishment for the UE of the GBR bearer, triggering handover of the UE from the first base station to the second base station on grounds that the first base station does not support downlink beamforming and the second base station supports downlink beamforming.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example network arrangement in which the disclosed principles can be implemented. Namely, the example network arrangement is shown as a network compliant with the well-known Long Term Evolution (LTE) protocol. It should be understood, however, that the disclosed principles can be applied in numerous other network arrangements as well and that, even within the arrangement described, various changes are possible. For instance, components and operations could be added, removed, distributed, replicated, combined, re-ordered, or otherwise modified. Further, it should be understood that operations described herein as being carried out by one or more components could be carried out by one or more programmed processing units or other structures.

Figure 1:
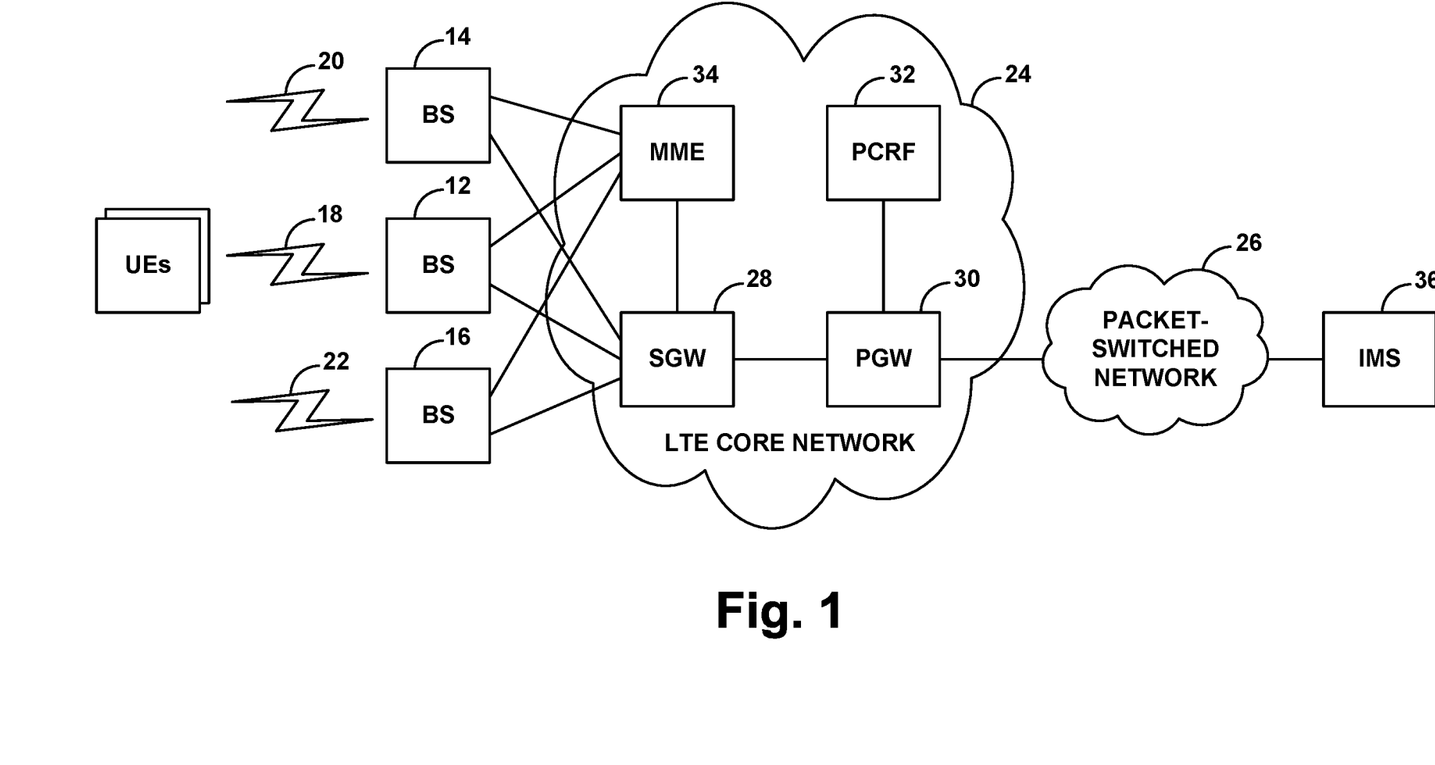
FIG. 1 is a simplified block diagram of a network arrangement in which aspects of the present disclosure can be implemented.

As shown in FIG. 1, the example network arrangement includes three representative base stations (e.g., LTE evolved Node-Bs (eNodeBs)) 12, 14, 16, each of which provides a respective coverage area 18, 20, 22 in which to serve UEs, and each of which is interfaced with an LTE core network 24 that provides connectivity with a packet-switched transport network 26 such as the Internet. In particular, each base station has a respective interface with a serving gateway (SGW) 28, which has an interface with a packet-data-network gateway (PGW) 30 that has an interface with a policy and charging rules function (PCRF) 32 and provides connectivity with transport network 26. Further, each base station also has a respective interface with a mobility management entity (MME) 34, which also has an interface with the SGW. In addition, shown accessible via the transport network 26 is a Internet Multimedia Subsystem (IMS) 36, which could support VoIP service and other packet-based real-time media service for UEs served by the LTE network.

In a representative LTE network such as this, each base station's coverage area operates on a carrier having a particular frequency bandwidth and defines an air interface that is structured to carry communications between the base station and served UEs. In particular, the air interface is divided over time into 10-millisecond frames, each of which is divided into ten 1-millisecond subframes or transmission time intervals (TTIs), and some or all of those TTIs per frame could be used for downlink communication from the base station to served UEs. Further, each downlink TTI is divided over the carrier frequency bandwidth into 15-kHz subcarriers and over time into 66.7-microsecond symbol time segments, thereby defining an array of resource elements each occupying a 15-kHz subcarrier and spanning 66.7 microseconds. And each such resource element could be structured to carry data using an applicable modulation and coding scheme (MCS).

Under LTE, each base station broadcasts within its coverage area a reference signal that UEs can evaluate as a basis to determine strength and quality of coverage from the base station. In particular, each base station broadcasts this reference signal within a pattern of resource elements distributed throughout each TTI. UEs within coverage of the base station could thus evaluate the receive power within those resource elements, to determine a reference signal receive power (RSRP) of the coverage area.

When a UE first enters into coverage of such a system, the UE could scan for a strongest coverage area in which to be served. The UE could then connect with the base station and register with the network for service. In particular, the UE could engage in random access signaling and Radio Resource Control (RRC) signaling with the base station to establish a RRC connection between the UE and the base station, and the UE could then send an attach request via the base station to the MME 34, to request registration with the LTE network.

In response to the UE's attach request, the MME 34 could coordinate establishment for the UE of one or more bearers as discussed above, with each bearer extending between the UE and the PGW 30, including a radio bearer portion extending between the UE and the base station and an access bearer portion extending between the base station and the PGW 30 via the SGW 28. For instance, to allow the UE to engage in general packet-data communication, the MME 34 could coordinate establishment for the UE of a non-GBR QCI 8 or 9 bearer. Further, to allow the UE to engage in VoIP service, the MME 34 could coordinate establishment for the UE of a non-GBR QCI 5 signaling bearer to carry SIP signaling between the UE and the IMS 36.

To coordinate establishment of each such bearer for a UE, the MME 34 could engage in signaling with the SGW 28 and the base station to establish a tunnel between the SGW 28 and the base station, and the SGW 28 could engage in signaling with the PGW 30 to establish a tunnel between the SGW 28 and the PGW 30, and the PGW 30 could engage in signaling with the PCRF 32 to verify the service level of the bearer. Upon setup of such a bearer, the base station could then store locally within a context record for the UE an indication of the established bearer and the bearer's service level—including its QCI level and, if not implicit in the QCI level, various other service level attributes such as those noted above.

Once the UE is so connected and attached, the base station could then serve the UE in an RRC connected mode, coordinating air interface transmissions to and from the UE. For instance, when data arrives on the transport network for transmission to the UE, the data could flow from the PGW 30 to the base station via an appropriate bearer established for the UE, and the base station could then coordinate transmission of the data over the air to the UE on that bearer. And when the UE has data to transmit on the transport network, the base station could coordinate transmission of the data over the air from the base station on an applicable bearer established for the UE, and the data could then flow from the base station to the PGW 30 for output on the transport network.

Further, as noted above, while the UE is being served, the network could establish for the UE one or more additional bearers, which might be GBR or non-GBR. For instance, when the UE engages in SIP signaling via a QCI 5 bearer with the IMS 36 to set up a VoIP call, the IMS 36 could responsively engage in signaling with the PCRF 32 to trigger establishment for the UE of a GBR QCI 1 bearer to carry the conversational voice traffic of the VoIP call. In response to signaling from the IMS 36, the PCRF 32 could then direct the PGW 30 to establish for the UE the QCI 1 bearer. Associated signaling could then flow from the PGW 30 to the SGW 28 to the MME 34, and the MME 34 could responsively coordinate QCI 1 bearer setup for the UE, and the base station could add to its context record for the UE an indication that the QCI 1 bearer is established for the UE. VoIP call traffic between the UE and the IMS 36 could then flow over this established QCI 1 bearer.

As explained above, when a base station transmits data over the air to a UE on a GBR bearer (such as a QCI 1 bearer), the base station could beamform its transmission to the UE in order to help meet the GBR requirement of the bearer. To facilitate this, the base station could be configured with equipment and associated control logic that directs the base station's transmission in the direction of the UE, thus helping to provide increased antenna gain and improved transmission quality and throughput for the UE. For instance, the base station could be equipped with radio, a power amplifier, and a smart antenna such as a phased-array antenna, which could cooperatively beamform transmission to the UE. Alternatively, the base station could be configured to beamform to the UE in other ways.

Figure 2:
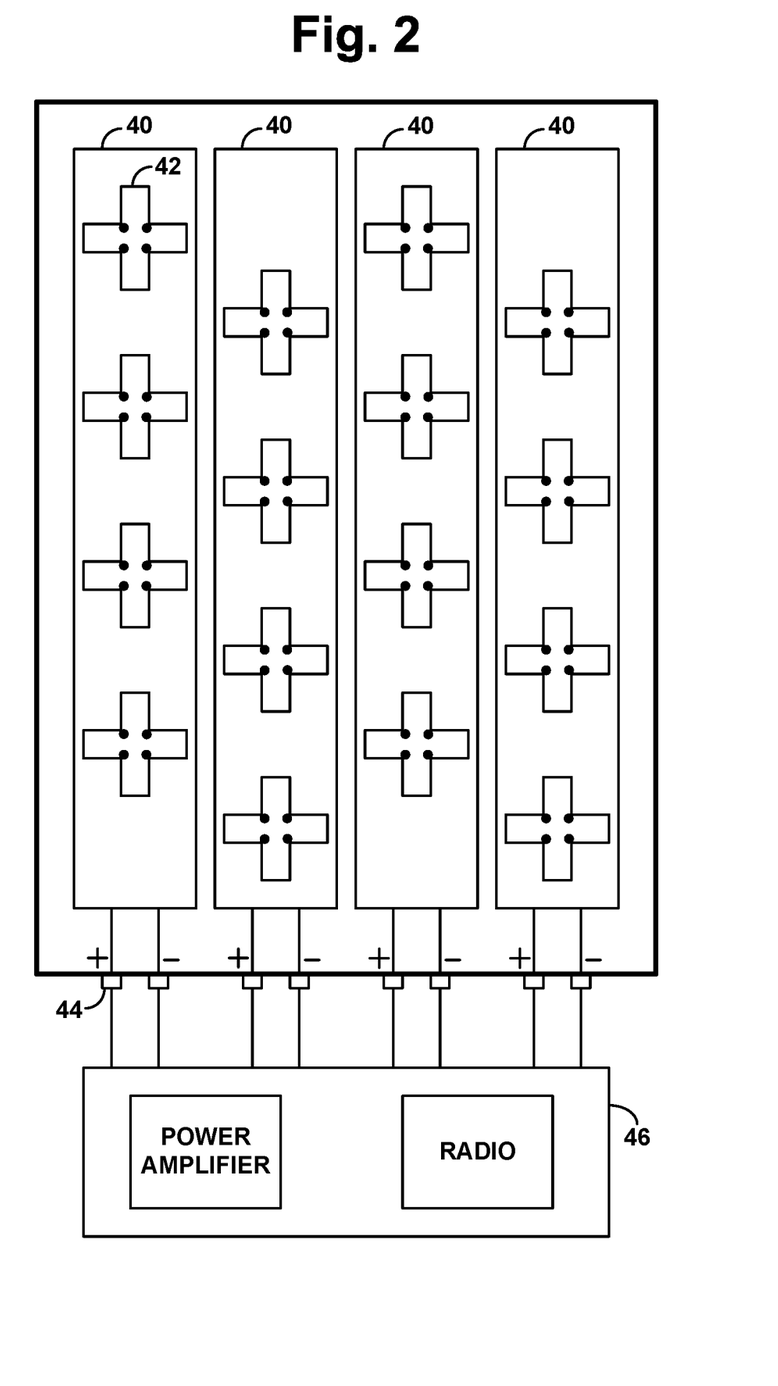
FIG. 2 is a simplified illustration of an example phased-array antenna structure suitable for providing beamforming service.

FIG. 2 is an illustration of an example phased-array antenna 38. As shown in FIG. 2, the example phased-array antenna has four columns 40 each containing a number of cross-polarized antenna elements 42, such that each column effectively defines two antennas, one consisting of the column's positively-polarized antenna elements, and the other consisting of the column's negatively-polarized antenna elements. Thus, the example phased-array antenna effectively includes eight antennas. Further, the example phased-array antenna includes eight radio-frequency (RF) ports 44, including a positive port for each column (coupled with the positively-polarized antenna elements of the column) and a negative port for each column (coupled with the negatively-polarized antenna elements of the column), and those ports could be interfaced with a power amplifier and radio 46 of the base station to facilitate transmitting and receiving via each of the eight antennas. With this arrangement, the base station could be configured to provide "8T8R" operation, with transmission via the eight antennas and reception via the eight antennas.

To beamform to the UE using this example 8T8R arrangement, the base station could programmatically set the phase and amplitude respectively of each antenna such that the waveforms of signals transmitted from the various antennas would constructively combine in the direction toward the location of the UE, thus focusing transmission in the direction of the UE. Further, under standard Transmission Mode #8 (TM8), the base station could provide dual-layer beamforming (beamforming two separate streams concurrently to the UE), by using the positively-polarized antennas to beamform one layer of transmission to the UE and using the negatively-polarized antennas across the columns column to beamform another layer of transmission to the UE. Other antenna and beamforming configurations are possible as well.

Optimally, when a base station is serving a UE and a GBR bearer is established for the UE, the base station could start beamforming its transmission to the UE on that GBR bearer. Unfortunately, however, as noted above, some base stations might not be configured to support beamforming. For instance, a base station might not include a phased-array antenna configuration (e.g., an 8T8R configuration as noted above) or other physical equipment that could facilitate beamforming. Further, even if the base station includes such equipment, the base station might not include control logic that facilitates beamforming, or the base station may include control logic that precludes beamforming. For instance, the base station might include a logical configuration setting (e.g., toggled flag) to not beamform.

If the base station serving the UE does not support downlink beamforming, then the base station would not be able to beamform its transmission to the UE on the UE's GBR bearer, and so the base station would not be able to apply beamforming to help meet the GBR requirement of the bearer.

Accordingly, as noted above, the present disclosure provides that when base station that does not support downlink beamforming is serving a UE and a GBR bearer gets established for the UE, the base station will respond to at least the establishment of the GBR bearer by triggering handover of the UE to another base station that supports downlink beamforming, so that the other base station could help to meet the GBR requirement of the bearer.

In addition, as noted above, some base stations might operate as donor base stations serving one or more relays, with such a relay in turn serving one or more other UEs or other relays. When a base station thus operates as a donor base station, the base station's air interface could be especially loaded with control and bearer traffic associated with the served relay(s), and as a result, the base station may have limited resources available. Therefore, if the base station is also serving a UE and a GBR bearer gets established for the UE, the base station may be unable to meet the GBR requirement of that bearer.

Accordingly, the present disclosure also provides that when a base that does not support downlink beamforming and that operates as a donor base station is serving a UE and a GBR bearer gets established for the UE, the base station will respond to at least the establishment of the GBR bearer by triggering handover of the UE to another base station that supports downlink beamforming and that is not operating as a donor base station, so that the other base station could help to meet the GBR requirement of the bearer.

Figure 3:
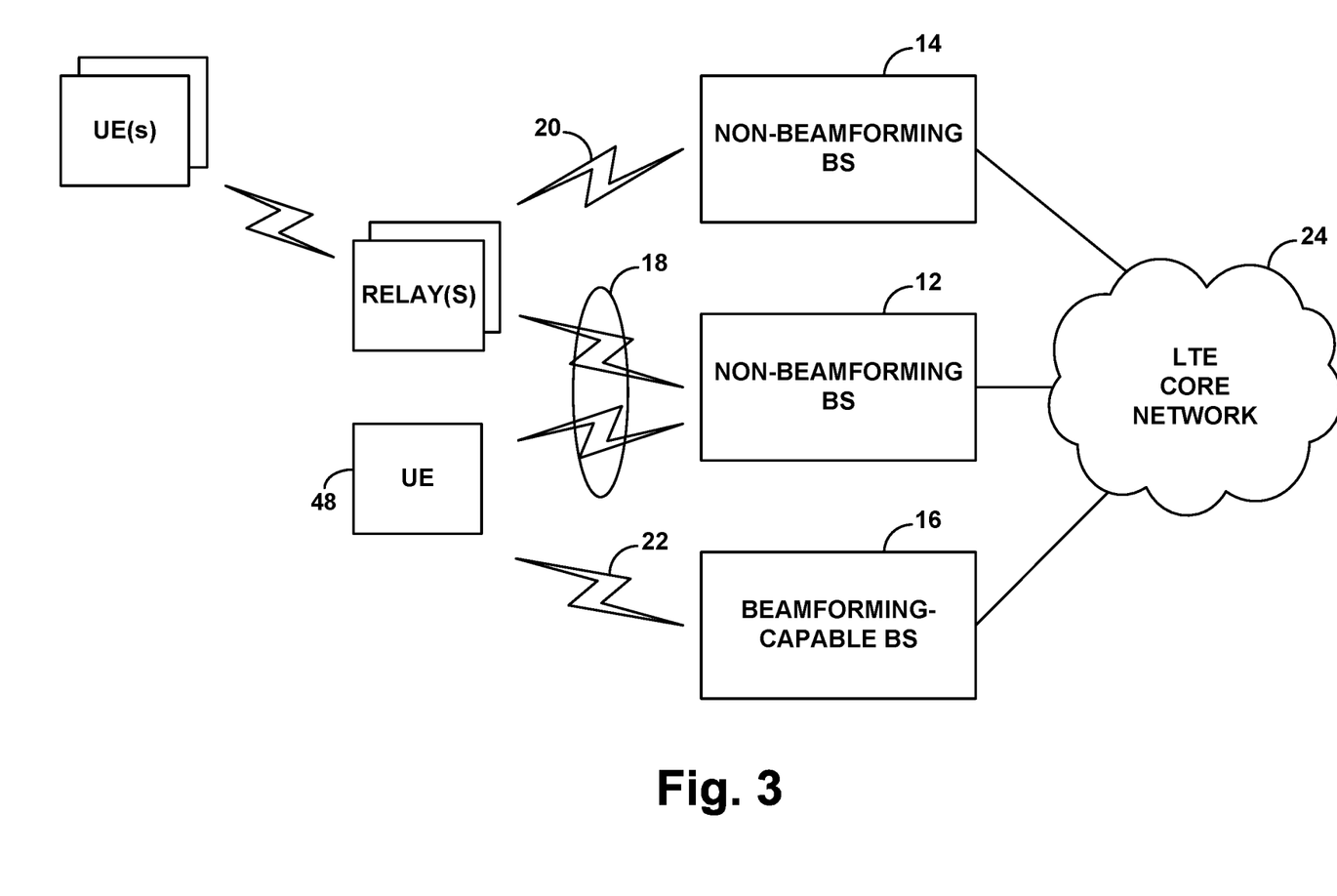
FIG. 3 is a simplified block diagram illustrating example base station configurations in the arrangement of FIG. 1.

FIG. 3 helps illustrate how this process could apply in the arrangement of FIG. 1 by way of example. As shown in FIG. 3, base stations 12 and 14 do not support downlink beamforming, and base station 16 supports downlink beamforming. Further, base station 12 is operating as a donor base station, serving one or more relays (e.g., cascaded relays) 48, whereas base stations 14 and 16 do not operate as donor base stations, as they are not serving any relays. As further shown, base station 12 is serving a representative UE 50. In practice, the network may have established one or more non-GBR bearers for UE 50, and the network may then establish a GBR bearer for the UE 50. For instance, the UE may have engaged in SIP signaling to set up a VoIP call, and the network may have responsively established a GBR QCI 1 bearer for the UE to carry conversational voice traffic of that call.

In this situation, base station 12 could detect the establishment of the GBR bearer for the UE, such as by receiving signaling from the LTE core network 24 indicating setup of the GBR bearer and specifying that the bearer is a GBR bearer (e.g., by specifying that the bearer is QCI 1, which is GBR) and/or by detecting when the UE's context record indicates that a GBR bearer has been established for the UE. Given that base station 12 does not support downlink beamforming (e.g., as base station 12 might determine by reference to stored data), base station 12 could then respond to the detected establishment of the GBR bearer for the UE by triggering handover of the UE to a base station that supports downlink beamforming. Further, given that base station 12 operates as a donor base station serving at least one relay (e.g., as base station might determine by reference to stored data), base station 12 could cause the handover to be to a beamforming-capable base station that is not operating as a donor base station.

To facilitate this process, base station 12 could have access to neighbor data that lists other base stations whose coverage overlaps with coverage of base station 12 and that indicates for each base station various attributes such as whether the base station supports downlink beamforming and whether the base station operates as a donor base station. This neighbor data could be stored at a centralized Element Management System (EMS) in the LTE core network 24, and the base station could engage in signaling with the EMS to access the data. Alternatively or additionally, this neighbor data could be stored locally at base station 12 or elsewhere accessible to the base station.

Further, base station 12 could direct UE 48 to scan for and report candidate target coverage for handover unless the base station has already receive such information from the UE. For instance, base station 12 could transmit to the UE a measurement directive that cause the UE to scan for and report other base station coverage that is sufficiently strong in relation to the UE's strength of coverage from base station 12 (e.g., threshold close to or higher than the RSRP from base station 12).

In an example implementation of this process, UE 48 might then scan for such coverage and report to base station 12 that the UE has detected sufficiently strong coverage from each of base stations 14 and 16. Referring to the neighbor data, base station 12 could then select between these candidate base stations based at least on whether they support downlink beamforming. Thus, base station 12 could select base station 16 as a handover target for the UE based at least on a determination that base station 16 is beamforming capable. Further, base station 12 could further base its selection of a target base station on the target base station not operating as a donor base station, and so this could be a further basis for selecting base station 16 as a handover target for the UE.

Upon selection of base station 16 as a handover target for UE 48, base station 12 could then trigger handover of the UE from base station 12 to base station 16. For instance, base station 12 could send a handover request message to base station 16 (e.g., via an X2 interface between the base stations) to cause base station 16 to reserve resources to serve the UE. Further, base station 12 could engage in further handover signaling with base station 16, and base station 12 could transmit to the UE a handover directive (e.g., as an RRC connection reconfiguration message) that directs the UE to transition from being served by base station 12 to being served by base station 16. And base station 12 and/or base station 16 could work with MME 34 to arrange for transfer of the UE's bearers, including the GBR bearer at issue, from base station 12 to base station 16.

Thus, when UE 48 transitions to be served by base station 16, base station 16 could serve the UE with communications on the UE's GBR bearer. And base station 16 might optimally use its downlink beamforming capability to help meet the GBR requirement of that bearer.

Figure 4:
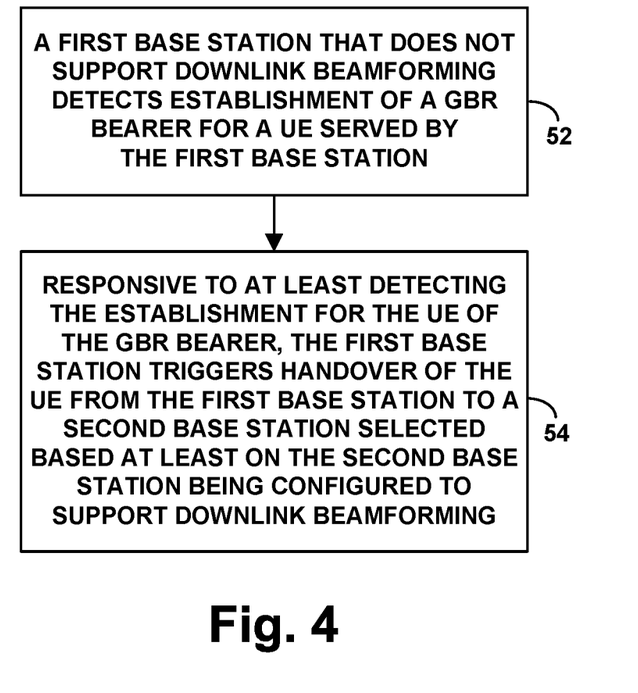
FIG. 4 is a flow chart depicting operations that can be carried out in accordance with the disclosure.

FIG. 4 is a flow chart depicting a method that could be carried out as described above, to control handover of a UE when the UE is being served by a first base station that is not configured to support downlink beamforming. As shown in FIG. 4, at block 52, the method includes the first base station detecting establishment for the UE of a GBR bearer. Further, at block 54, the method includes, responsive to at least the first base station detecting the establishment for the UE of the GBR bearer, the first base station triggering handover of the UE from the first base station to a second base station selected based at least on the second base station being configured to support downlink beamforming.

In line with the discussion above, the act of triggering handover of the UE from the first base station to the second base station could be additionally responsive to the first base station not being configured to support downlink beamforming. For instance, the first base station could refer to configuration data of its own to determine that it does not support downlink beamforming. And responsive to at least the detecting of the establishment for the UE of the GBR bearer and the determination that the first base station does not support downlink beamforming, the first base station could trigger handover of the UE from the first base station to the second base station selected based at least on the second base station supporting downlink beamforming.

Further, the act of triggering handover of the UE from the first base station to the second base station could be additionally responsive to the UE being in threshold poor coverage of the first base station. For instance, the first base station could determine that the UE's RSRP from the first base station is lower than a predefined threshold, which could indicate a situation where the UE is distant from the first base station, perhaps in an area of overlap with coverage of the second base station (and thus perhaps also distant from the second base station). And responsive to at least the detecting of the establishment for the UE of the GBR bearer, the determination that the first base station does not support downlink beamforming, and the determination that the UE being in threshold poor coverage of the first base station, the first base station could trigger handover of the UE from the first base station to the second base station selected based at least on the second base station supporting downlink beamforming.

In addition, the act of the first base station detecting establishment for the UE of the GBR bearer could involve the first base station detecting establishment of a new bearer for the UE and the first base station detecting that the new bearer is GBR. The method could then involve, responsive to detecting that the new bearer is GBR, (i) the first base station determining whether the second base station is configured to support downlink beamforming and (ii) the first base station selecting the second base station based at least on the determination being that the second base station is configured to support downlink beamforming.

More particularly, as discussed above, the act of selecting the second base station based at least on the determination being that the second base station is configured to support downlink beamforming could involve directing the UE to scan for target coverage for handover, receiving in response from the UE a report indicating that the UE has detected coverage of the second base station, and determining that the second base station is configured to support downlink beamforming. Further, as noted above, the first base station could have access to neighbor data that indicates whether the second base station is configured to support downlink beamforming, and the act of making the determination of whether the second base station is configured to support downlink beamforming could involve making the determination based on the neighbor data.

As further discussed above, the determination of whether the second base station is configured to support downlink beamforming could be based on whether the second base station has an antenna configuration that supports downlink beamforming. For instance, at issue could be whether the second base station has an antenna configuration that comprises a smart antenna supporting at least 8T8R operation, and perhaps specifically TM8 operation. Further or alternatively, the determination of whether the second base station is configured to support downlink beamforming could be based on whether the second base station is logically set to support downlink beamforming.

In addition, as discussed above, the first base station could be a donor base station that serves one or more relays in addition to serving the UE. And in that case, the act of the first base station selecting the second base station could be further based on the second base station not serving any relays, which could also be indicated by neighbor data or the like.

Further, as discussed above, the GBR bearer established for the UE could be a conversational-voice bearer for carrying packetized voice traffic. For instance, the GBR bearer could be a QCI 1 bearer. Alternatively, the GBR bearer could be for other purposes and could have another QCI value.

Additionally, as discussed above, the act of triggering handover of the UE from the first base station to the second base station could involve initiating the handover. For instance, the act of triggering the handover could include transmitting a handover request from the first base station to the second base station to prepare the second base station to serve the UE. Further, the act of triggering handover of the UE from the first base station to the second base station could include other steps as well.

Figure 5:
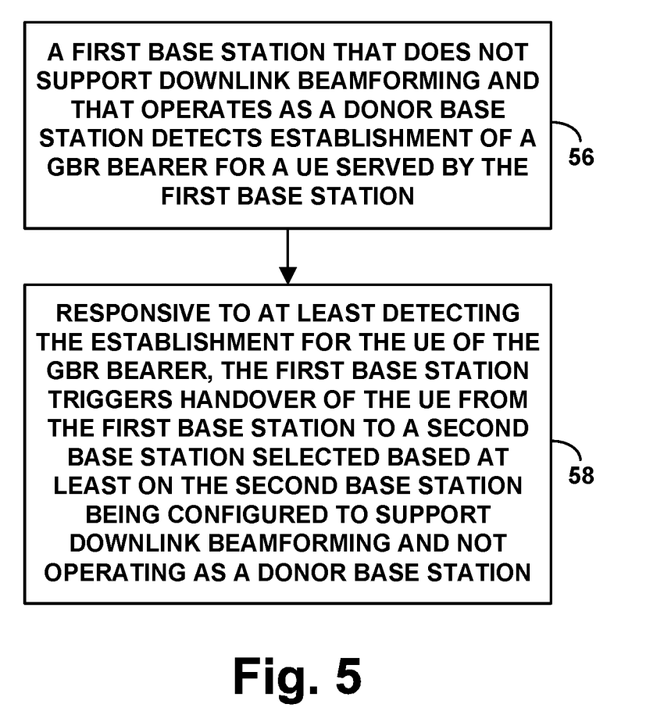
FIG. 5 is another flow chart depicting operations that can be carried out in accordance with the disclosure.

FIG. 5 is next another flow chart depicting a method that could be carried out as described above, to control handover of a UE when the UE is being served by a first base station that is not configured to support downlink beamforming and that is currently serving one or more relays in addition to serving the UE. As shown in FIG. 5, at block 56, the method includes the first base station detecting establishment for the UE of a GBR bearer. And at block 58, the method includes, responsive to at least the first base station detecting the establishment for the UE of the GBR bearer, the first base station triggering handover of the UE from the first base station to a second base station selected based at least on the second base station (i) being configured to support downlink beamforming and (ii) not serving any relays. Various features discussed above could be applied in the context of this method, and vice versa.

Figure 6:
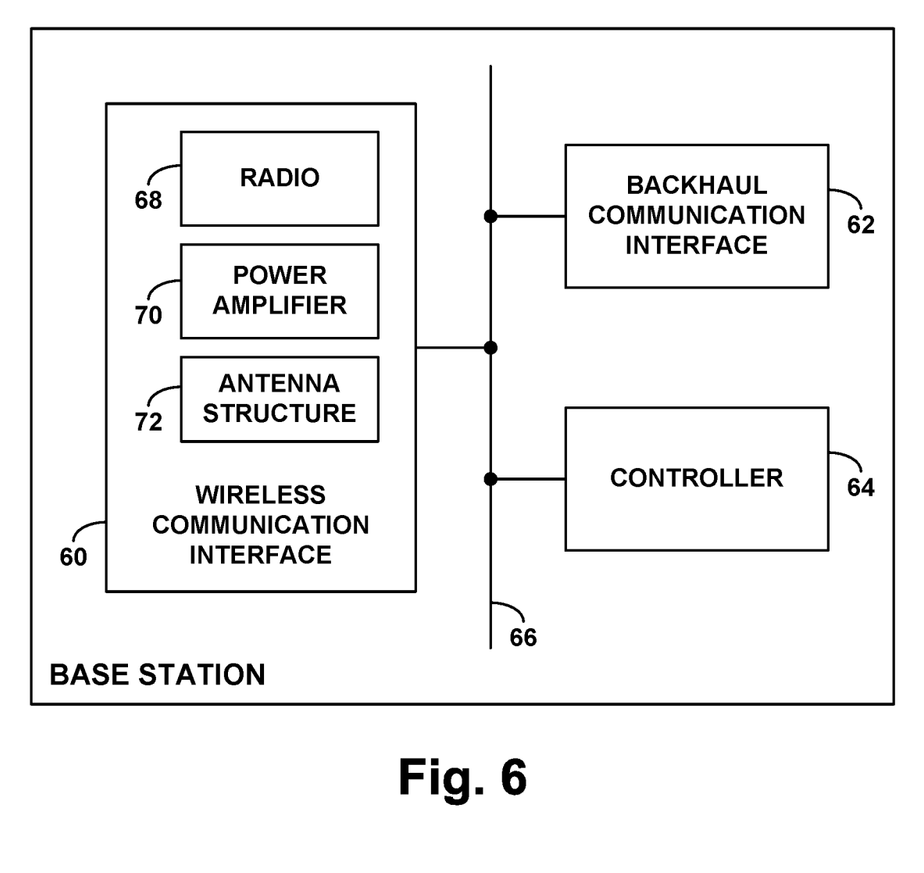
FIG. 6 is a simplified block diagram of a base station operable in accordance with the disclosure.

Finally, FIG. 6 is a simplified block diagram of a base station that could operate as the first based station in a system such as that described above, namely, in a system that includes the first base station and a second base station, where the first base station does not support downlink beamforming but the second base station supports downlink beamforming.

As shown in FIG. 6, the example base station includes a wireless communication interface 60, a backhaul communication interface 62, and a controller 64, which could be integrated together and/or communicatively linked by a network, system bus, or other connection mechanism 66.

Wireless communication interface 60 includes a radio 68, a power amplifier 70, and antenna structure 72. The radio could operate to interface between encoded baseband signals and RF signals, and the power amplifier could operate to amplify signals for transmission by the antenna structure 72. The antenna structure 72 might have a configuration that does not support downlink beamforming. For instance, the antenna structure might be a phased-array antenna that does not have sufficiently spaced antenna elements to facilitate downlink beamforming (perhaps insufficient to provide TM8 beamforming), or the antenna structure might be another type of antenna structure that does not support downlink beamforming. Alternatively, the antenna structure might support downlink beamforming, but the radio 68 might be set to not allow downlink beamforming.

Backhaul communication interface 62 could then be a network communication interface (e.g., an Ethernet network interface port and/or connection) through which the base station can communicate with various other network entities, such as with the second base station. Through this interface, for instance, the base station might engage in handover signaling to facilitate handover of the UE from being served by the first base station to being served by the second base station.

Controller 64, which could comprise a processing unit, data storage, and program instructions stored in the data storage and executable by the processing unit, or could take other forms, operable to cause the base station to carry out various operations when the base station is serving the UE. For instance, the operations could include detecting establishment for the UE of a GBR bearer. And the operations could include, responsive to at least the detecting of the establishment for the UE of the GBR bearer, triggering handover of the UE from the first base station to the second base station on grounds that the first base station does not support downlink beamforming and the second base station supports downlink beamforming.

Various features described above could be applied in this context, and vice versa. For example, the act of detecting establishment for the UE of the GBR bearer could involve detecting establishment of a new bearer for the UE and detecting that the new bearer is guaranteed-bit-rate. More specifically, the operations could additionally include detecting that the new bearer is GBR, making a determination of whether the second base station supports downlink beamforming, and selecting the second base station for the handover based at least on the determination being that the second base station supports downlink beamforming. For instance, the first base station could have access to neighbor data that indicates whether the second base station supports downlink beamforming, and the act of making the determination of whether the second base station supports downlink beamforming could involve making the determination based on the neighbor data. Still further, the GBR bearer could be a conversational-voice bearer for carrying packetized voice traffic.

Exemplary embodiments have been described above. Those skilled in the art will understand, however, that changes and modifications may be made to these embodiments without departing from the true scope and spirit of the invention.

We claim:

1. A method for controlling handover of a user equipment device (UE) when the UE is being served by a first base station that is not configured to support downlink beamforming, the method comprising:
    detecting by the first base station establishment for the UE of a guaranteed-bit-rate (GBR) bearer; and
    responsive to at least the detecting by the first base station of the establishment for the UE of the GBR bearer, the first base station triggering handover of the UE from the first base station to a second base station selected based at least on the second base station being configured to support downlink beamforming.

2. The method of claim 1, wherein triggering handover of the UE from the first base station to the second base station is additionally responsive to the first base station not being configured to support downlink beamforming.

3. The method of claim 2, wherein triggering handover of the UE from the first base station the second base station is additionally responsively to the UE being in threshold poor coverage of the first base station.

4. The method of claim 1, wherein detecting by the first base station establishment for the UE of the GBR bearer comprises detecting by the first base station establishment of a new bearer for the UE and detecting by the first base station that the new bearer is GBR.

5. The method of claim 4, further comprising, responsive to detecting that the new bearer is GBR, (i) making a determination by the first base station whether the second base station is configured to support downlink beamforming and (ii) selecting by the first base station the second base station based at least on the determination being that the second base station is configured to support downlink beamforming.

6. The method of claim 5, wherein selecting the second base station based at least on the determination being that the second base station is configured to support downlink beamforming comprises directing the UE to scan for target coverage for handover, receiving in response from the UE a report indicating that the UE has detected coverage of the second base station, and determining that the second base station is configured to support downlink beamforming.

7. The method of claim 5, wherein the first base station has access to neighbor data that indicates whether the second base station is configured to support downlink beamforming, and wherein making the determination of whether the second base station is configured to support downlink beamforming comprises making the determination based on the neighbor data.

8. The method of claim 5, wherein the determination of whether the second base station is configured to support downlink beamforming is based on whether the second base station has an antenna configuration that supports downlink beamforming.

9. The method of claim 8, wherein the antenna configuration comprises a smart antenna supporting at least 8T8R operation.

10. The method of claim 5, wherein the determination of whether the second base station is configured to support downlink beamforming is based on whether the second base station is logically set to support downlink beamforming.

11. The method of claim 5, wherein the first base station is a donor base station serving one or more relays in addition to serving the UE, and wherein selecting the second base station is further based on the second base station not serving any relays.

12. The method of claim 1, wherein the GBR bearer is a conversational-voice bearer for carrying packetized voice traffic.

13. The method of claim 1, wherein the GBR bearer is a Quality of Service Class Identifier (QCI) 1 bearer.

14. The method of claim 1, wherein triggering handover of the UE from the first base station to the second base station comprises initiating the handover, including transmitting a handover request from the first base station to the second base station to prepare the second base station to serve the UE.

15. A method for controlling handover of a user equipment device (UE) when the UE is being served by a first base station that is not configured to support downlink beamforming and that is currently serving one or more relays in addition to serving the UE, the method comprising:
  detecting by the first base station establishment for the UE of a guaranteed-bit-rate (GBR) bearer; and
  responsive to at least the detecting by the first base station of the establishment for the UE of the GBR bearer, the first base station triggering handover of the UE from the first base station to a second base station selected based at least on the second base station (i) being configured to support downlink beamforming and (ii) not serving any relays.

16. In a system comprising a first base station and a second base station, wherein the first base station does not support downlink beamforming and the second base station supports downlink beamforming, the first base station comprising:
  an antenna structure through which the first base station engages in air interface communication with a user equipment device (UE) when the first base station serves the UE;
  a backhaul communication interface through which the first base station can communicate with the second base station;
  a controller operable to cause the first base station to carry out operations comprising, when the first base station is serving the UE, (i) detecting establishment for the UE of a guaranteed-bit-rate bearer and (ii) responsive to at least the detecting of the establishment for the UE of the guaranteed-bit-rate bearer, triggering handover of the UE from the first base station to the second base station on grounds that the first base station does not support downlink beamforming and the second base station supports downlink beamforming.

17. The first base station of claim 16, wherein detecting establishment for the UE of the guaranteed-bit-rate bearer comprises detecting establishment of a new bearer for the UE and detecting that the new bearer is guaranteed-bit-rate.

18. The first base station of claim 16, wherein the operations further comprise detecting that the new bearer is guaranteed-bit rate, making a determination of whether the second base station supports downlink beamforming, and selecting the second base station for the handover based at least on the determination being that the second base station supports downlink beamforming.

19. The base station of claim 18, wherein the first base station has access to neighbor data that indicates whether the second base station supports downlink beamforming, and wherein making the determination of whether the second base station supports downlink beamforming comprises making the determination based on the neighbor data.

20. The base station of claim 16, wherein the guaranteed-bit-rate bearer is a conversational-voice bearer for carrying packetized voice traffic.

* * * * *